United States Patent
Tsyba et al.

(10) Patent No.: US 12,546,877 B1
(45) Date of Patent: Feb. 10, 2026

(54) MOTION DETECTOR

(71) Applicant: Amazon Technologies, Inc., Seattle, WA (US)

(72) Inventors: Yevhen Tsyba, Kyiv (UA); Bogdan Ruzhitskiy, Kyiv (UA); Mykyta Erikaikin, Kyiv (UA)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 638 days.

(21) Appl. No.: 17/990,184

(22) Filed: Nov. 18, 2022

Related U.S. Application Data

(60) Provisional application No. 63/419,250, filed on Oct. 25, 2022.

(51) Int. Cl.
| | |
|---|---|
| G01S 13/56 | (2006.01) |
| G01S 7/35 | (2006.01) |
| G01S 13/536 | (2006.01) |
| G01S 13/86 | (2006.01) |

(52) U.S. Cl.
CPC ............. *G01S 13/56* (2013.01); *G01S 7/356* (2021.05); *G01S 13/536* (2013.01); *G01S 13/86* (2013.01)

(58) Field of Classification Search
CPC ........ G01S 13/56; G01S 13/42; G01S 13/886; G01S 15/42; G01S 7/415; G08B 13/19; A61B 5/11; G06V 40/20
See application file for complete search history.

(56) References Cited

U.S. PATENT DOCUMENTS

| | | | |
|---|---|---|---|
| 11,726,184 B2 * | 8/2023 | Ferreira | G01S 17/894 |
| | | | 356/4.01 |
| 2020/0342748 A1 * | 10/2020 | Tournier | G08B 13/19 |
| 2021/0072378 A1 * | 3/2021 | Shin | G01S 15/88 |
| 2021/0231775 A1 * | 7/2021 | Pezeshk | G01S 7/417 |
| 2023/0393259 A1 * | 12/2023 | Hazra | A61B 5/0507 |

* cited by examiner

*Primary Examiner* — Vladimir Magloire
*Assistant Examiner* — Eric K Hodac
(74) *Attorney, Agent, or Firm* — K&L Gates LLP

(57) ABSTRACT

Systems and techniques are described for motion detection. In various examples, a radar sensor may transmit at least a first frame and a second frame over a first period of time. Difference data representing differences between at least a first signal corresponding to the first frame and a second signal corresponding to the second frame may be determined by the radar sensor. First data may be determined by a passive infrared (PIR) sensor over the first period of time. A first machine learning model may generate, using the difference data and the first data, second data indicating whether motion is detected during the first period of time.

36 Claims, 8 Drawing Sheets

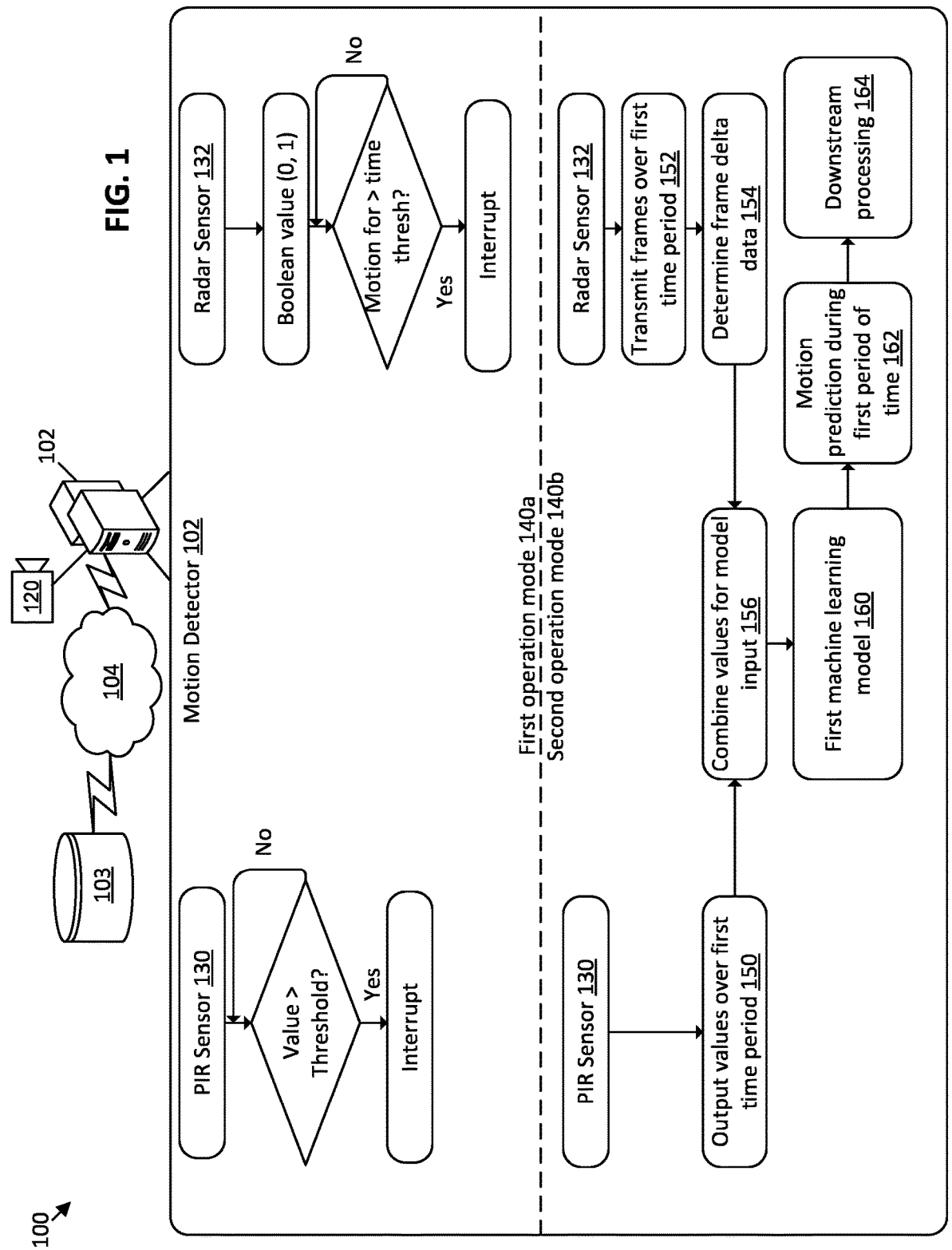

MOTION DETECTOR

CROSS-REFERENCE TO RELATED APPLICATIONS

This application claims the benefit of U.S. Provisional Application No. 63/419,250, filed Oct. 25, 2022, the disclosure of which is incorporated herein by reference in its entirety.

BACKGROUND

Security systems may use one or more cameras to capture video data of areas of interest. For example, video security cameras may be positioned so as to surveil an entryway into a secure area such as a bank vault or an entrance to a private residence. Security camera systems sometimes use motion detection to initiate video capture and/or video streaming to one or more other devices. For example, upon detection of motion in video data, a camera may be configured to capture and send a live feed of video from the camera to a cloud-based server system, a central computing device, and/or to a mobile application executing on a mobile phone. In other examples, upon detection of motion in video data, a camera may begin storing captured video data in a data storage repository.

BRIEF DESCRIPTION OF DRAWINGS

FIG. 1 is a diagram illustrating a motion detector configured in communication with a camera device, in accordance with various aspects of the present disclosure.

DETAILED DESCRIPTION

Figure 2A:
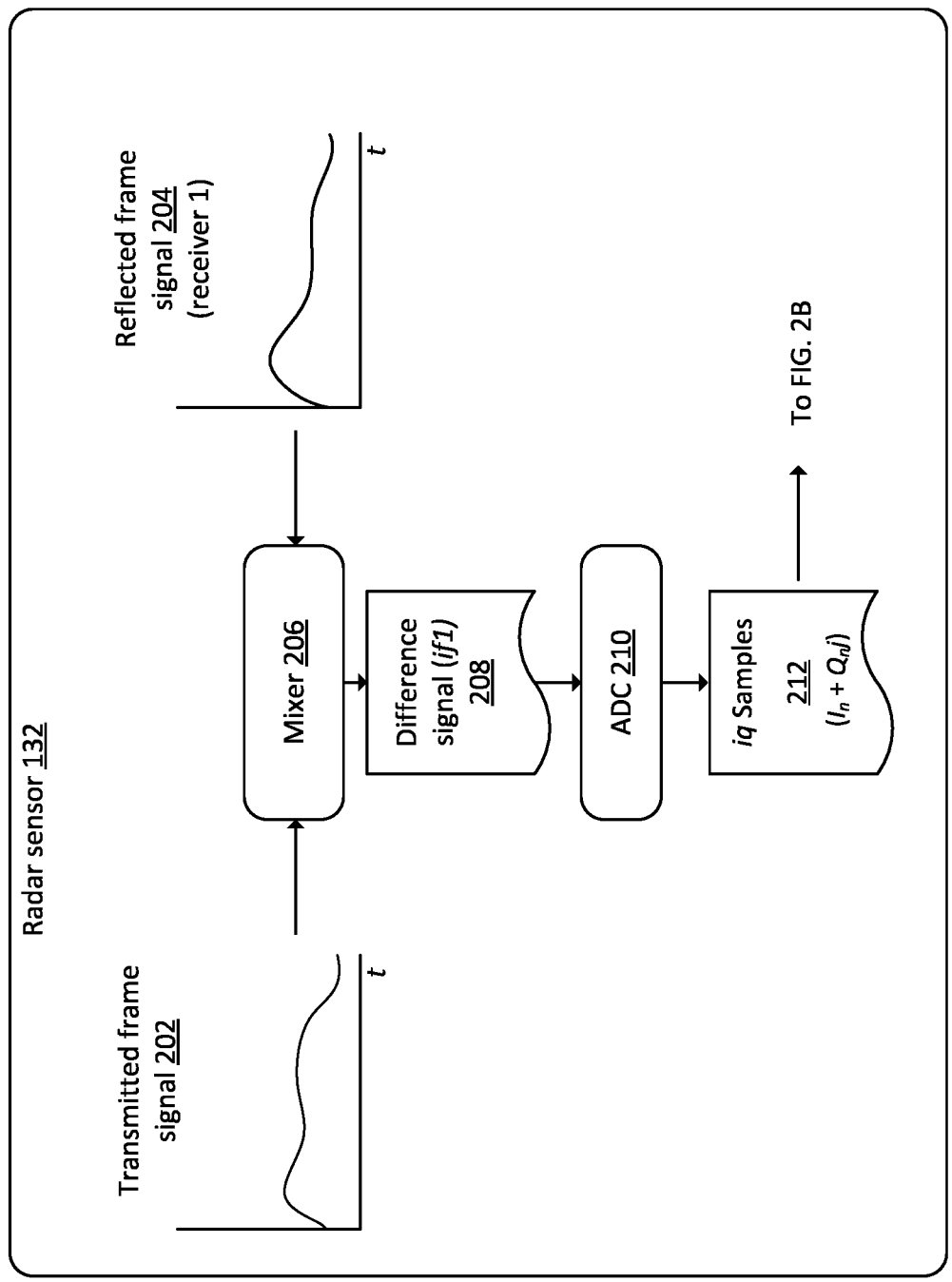
FIG. 2A depicts example processing steps and components of a radar sensor of the motion detector of FIG. 1, in accordance with various aspects of the present disclosure.

In the following description, reference is made to the accompanying drawings which illustrate several embodiments of the present invention. It is understood that other embodiments may be utilized and mechanical, compositional, structural, electrical operational changes may be made without departing from the spirit and scope of the present disclosure. The following detailed description is not to be taken in a limiting sense, and the scope of the embodiments of the present invention is defined only by the claims of the issued patent.

In various examples, a location such as an office building, home, outdoor space, and/or any other physical location or combination of physical locations may be monitored by one or more camera devices of a security system or other type of camera system. In various examples, camera devices may be battery-powered for ease of installation and to avoid unsightly power cords. In various other examples, camera devices may be powered through a wired interface (e.g., through "mains" power from a wall socket). In at least some examples, camera devices may include motion sensors to detect motion. In some examples, camera devices may be operated in a low power state (sometimes referred to as "sleep" mode) prior to detection of motion. In some examples, during the low power state, the camera may capture and store a limited amount of video in a rolling buffer—with the oldest portions of the video in the rolling buffer being deleted as video from the current time is stored. When motion is detected the camera device may begin encoding and/or streaming video to one or more other devices (e.g., a video processing device) for storage, display, and/or processing. For example, the contents of the rolling buffer may be encoded and sent to another device followed by a stream of video captured by the camera while motion is detected. Advantageously, waiting until motion is detected prior to capturing and/or streaming image data and/or video data may prolong battery life (and minimize power consumption) by capturing, encoding, and/or streaming video only when movement is detected. In many cases, and particularly in a surveillance context, video segments that do not depict movement and/or which represent trivial movement (e.g., leaves blowing in the wind) may not be of sufficient interest to a user of the camera system to warrant continuous video capture and/or streaming, particularly given that transmission of video data results in a quicker consumption of battery power and more frequent battery replacement. In various examples, video data may refer to one or more sequential frames of image data.

In some examples, insignificant motion may trigger a motion sensor of a camera device, which may, in turn, cause the camera device to begin capturing and/or streaming video even though the video may not be of interest to a user. Accordingly, it may be beneficial to limit the number of such "false positives" where insignificant motion results in video capture and/or streaming, which, in turn, may lead to increased power consumption and depletion of battery power. For example, an outdoor camera device may include a motion sensor with a "field-of-view" (e.g., the area monitored by the motion sensor) that includes a tree outside of a user's home. In the example, the motion sensor may be triggered each time that the wind blows and the leaves of the tree are rustled. The triggering of the motion sensor may, in turn, cause the camera device to capture and/or stream video. In another example, a motion sensor may be triggered each time a pet moves within the field-of-view (FOV) of the motion sensor. In another example, a motion sensor may be triggered by cloud movement and sunlight changes due to passing clouds. Various systems and techniques described herein may be effective to prevent triggering of video capture and/or streaming due to inconsequential motion that is not likely to be of interest to a user.

In various examples, camera devices may include and/or be configured in communication with passive infrared (PIR) sensors effective to detect motion in an environment monitored by the PIR sensor and/or by the camera devices. PIR sensors detect infrared (IR) radiation emitted by objects within the PIR sensors' fields-of-view. In some examples, the PIR sensors may be referred to herein as "PIR motion detectors" and "PIR motion sensors". In various examples, a PIR sensor may be effective to determine when an object passes through a PIR sensor's field-of-view by determining differential changes in the IR detected by the PIR sensor. PIR sensors often include two sensor "halves" and/or multiple sensor regions. A multi-facet lens breaks light received from a scene into multiple regions and projects these regions on to the different halves or regions of the sensor. The sensor integrates the black body radiation detected in the two halves (or in the multiple regions, depending on the sensor) and determines the differential change. The differential change is the difference in detected radiation between the two sensor halves (or between the different regions). If the differential changes caused by an IR-radiating object entering the field-of-view (resulting in a positive differential change in detected IR) and/or leaving the field-of-view (resulting in a negative differential change in detected IR) of the PIR sensor are above a threshold value (typically a tunable threshold referred to as the "sensitivity" of the PIR sensor), the PIR sensor may output a signal indicating that motion has been detected. PIR sensors may be passive in the sense that they may not include any IR light source and may detect radiation emitted from objects within the sensor's field-of-view without subjecting such objects to IR light projected by a light source of the sensor. Accordingly, PIR sensors consume relatively little power when in use.

A passive infrared sensor may comprise, for example, two pyroelectric sensing elements. Each pyroelectric sensing element comprises a pyroelectric crystal. Each pyroelectric sensing element generates an electrical charge in response to heat. Radiation (e.g., infrared light) received at a surface of a pyroelectric sensing element generates heat, which in turn generates an electrical charge. Put another way, an absorbing layer of a pyroelectric sensing element transforms radiation flux change into a change in temperature and a pyroelectric component performs a thermal to electrical conversion. One or more low-noise and low leakage current field-effect transistors (e.g. JFET) or operational amplifiers are used to convert charge into a signal voltage.

A passive infrared sensor may comprise two pyroelectric sensing elements electrically coupled together with opposite polarization to produce an output. In this way, an equal change in temperature at both of the pyroelectric sensing elements will cancel out in the output signal, thus filtering out temperature changes in the environment. However, a change in temperature at only one of the pyroelectric sensing elements will result in an output signal that is positive or negative (depending on which pyroelectric sensing element experienced the change in temperature).

A passive infrared sensor may include two slots, each providing an optical path to one of the pyroelectric sensing elements. A passive infrared sensor may comprise one or more lenses configured to direct light received at the one or more lenses onto one of the pyroelectric sensing elements. A passive infrared sensor may include one or more lenses configured to direct light received at a first portion of the one or more lenses (e.g. a left portion) onto a first of the pyroelectric sensing elements (e.g. a left sensing element), and to direct light received at a second portion of the one or more lenses (e.g. a right portion) onto a second of the pyroelectric sensing elements (e.g. a right sensing element). The one or more lenses may comprise one or more Fresnel lenses having one or more features configured to direct light. The pyroelectric elements may be positioned side by side and aligned along an axis (e.g. a horizontal axis or a vertical axis).

A passive infrared sensor may be analog, with an analog signal output, or may be digital, with digital data output generated utilizing an analog-to-digital converter (ADC) (e.g. output from the ADC or output generated based on output from the ADC).

An electronic device may include one or more passive infrared sensors that the electronic device uses to detect motion of objects. Each passive infrared sensor may output a signal or sensor data, where the electronic device uses a characteristic determined using the signal or sensor data to determine whether the passive infrared sensor detected an object. The characteristic may include a voltage represented by the signal or sensor data, an amplitude of a wave generated or determined using the signal or sensor data, an angle of the wave generated using the signal or sensor data, and/or the like.

For example, a first passive infrared sensor may have a first field-of-view (FOV) that extends a first distance from the electronic device. In some examples, the first FOV is created based on placing the first passive infrared sensor in a first direction and/or using one or more lenses (which may be a lens of the passive infrared sensor or which may be used in addition to or in replacement of a lens of the passive infrared sensor).

In accordance with one or more preferred implementations, a PIR sensor includes an integrated circuit (IC) component that receives voltage inputs from one or more lines coupled to a first PIR sensing element and a second PIR sensing element. In accordance with one or more preferred implementations, the IC component receives an input from each sensing element, while in accordance with one or more preferred implementations, the IC component receives a summed voltage.

In accordance with one or more preferred implementations, the IC component determines whether a summed voltage exceeds a first threshold, and, if so, sends a logic signal (e.g. a Boolean value or an interrupt) to a controller (e.g. a microcontroller unit or MCU) of an electronic device. Based on the received logic signal, the controller begins periodically polling or requesting PIR data (e.g. a most recent data value at the time of polling) from the IC component. For example, the controller may poll the IC component at a rate of 64 Hz. In accordance with one or more preferred implementations, the logic signal represents an interrupt that triggers additional processing based on radar data and PIR data as described herein.

In some example systems, if motion is detected in an environment monitored by a motion sensor such as a PIR sensor, the triggered motion sensor may send a signal to one or more camera devices associated with the motion sensor. The signal may be effective to cause the camera device(s) to begin capturing image data and/or video data. For example, a PIR sensor and a camera device may be situated in a particular room of a building. If the PIR sensor is triggered (e.g., due to a human walking through the room), the PIR sensor may send a signal to the camera device indicating that motion has been detected by the PIR sensor. In response to receipt of the signal from the PIR sensor, the camera may be configured to begin capturing video.

However, the triggering of a PIR sensor (e.g., a PIR sensor detecting a motion event) may rely on tunable thresholds (e.g., a threshold magnitude of differential change between the halves of a PIR sensor). If such thresholds are set too high, motion events of interest may be missed without the camera being triggered. Conversely, if such thresholds are set too low, insignificant motion events (e.g., leaves blowing in the wind, raindrops, etc.) may cause the camera device to be triggered, resulting in the camera capturing video of events that are unlikely to be of interest to the user and potentially causing information fatigue (where the user is unlikely to pay attention to video feeds from the camera due to a large number of false positives).

Additionally, PIR sensors may have difficulties distinguishing between motion that is likely to be of interest to a user and motion that is relatively inconsequential and unlikely to be of interest to a user. For example, an outdoor PIR may trigger based on sunlight that is filtered through a tree as the wind blows the leaves of the tree and different amounts of radiation are detected by different regions and/or halves of the PIR sensor. Additionally, in scenarios where the target objects to be detected are people at relatively short distances (e.g., a PIR sensor in a video-enabled doorbell camera), large, non-target objects at greater distances, like cars passing on a street, can cause false triggering of the PIR sensor. Additionally, PIR sensors often have difficulty detecting motion when the motion is directly toward or away from the PIR sensor, as the radiation from such objects may not pass between different sensor halves and/or sensor regions and thus may not trigger the PIR sensor. To account for this difficulty, the sensitivity of the PIR sensor may be increased, which in turn, may lead to increased false triggering due to distant non-target motion.

To help eliminate false triggering in PIR motion-sensing systems that are not highly power constrained, a secondary form of motion sensing may be used. For example, secondary radio frequency (RF) motion detectors and video analytics in camera systems may be used to corroborate detection of motion by a PIR sensor. However, in battery-operated cameras, video analytics may consume a significant amount of power and may thereby significantly shorten battery life in some cases. Described herein is a two-stage radar and PIR-based motion detector that may be used in battery-operated cameras and that may be used to reliably detect motion while reducing the number of false positives.

A radar sensor may use a frequency modulated continuous wave (FMCW) approach where a set of one or more frequency modulated chirps and transmitted, and the returning signals are utilized to determine distances to detected objects.

In accordance with one or more preferred implementations, a received signal is mixed with a transmitted signal (e.g. transmitted using an antenna). The received signal represents a reflection of the transmitted signal that has been received after it has reflected off of surfaces and/or objects within the environment (e.g., an environment being monitored by the radar sensor) to generate an intermediate frequency (IF) signal. Specifically, the transmitted and received signals are inputs to an RF mixer that mixes the two inputs together. The result of this mixing is an output signal that has an instantaneous frequency for each time t equal to the difference between the instantaneous frequencies of each of the signals at that time t. The output signal has an instantaneous phase for each time t equal to the difference between the instantaneous phases of each of the signals at that time t.

In accordance with one or more preferred implementations, this IF signal is then filtered with a low pass filter, and then an analog to digital converter is utilized to generate samples representative of the IF signal, e.g. by sampling at a certain rate (such as 10 Hz).

In accordance with one or more preferred implementations, a sample may be stored and manipulated as a complex data object. In accordance with one or more preferred implementations, a complex data object comprises data representing or indicating a magnitude and phase at a respective time t. Each complex data object may represent a complex number indicating the magnitude and phase of the complex data object for a particular time j, where j is from time 1 to $j_{max}$ (the sampling period).

In accordance with one or more preferred implementations, a complex data object may comprise data representing a time t and a complex number a+bi, where a indicates a magnitude and b indicates a phase. In accordance with one or more preferred implementations, this magnitude and phase are represented as a phasor.

In accordance with one or more preferred implementations, a complex data object may comprise data representing a time t and a complex number $(I_n+Q_n i)$ in in-phase and quadrature (IQ) notation. A complex data object may be characterized as representing a complex number taking the form $(I_n+Q_n i)$ for a complex data object n, which may be for example a complex data object corresponding to time j.

A complex data object may comprise a first value corresponding to an I component, and a second value corresponding to a Q component. In traditional signal processing, the I component is commonly characterized as an in-phase component, and the Q component is commonly characterized as a quadrature component, with a signal represented by the complex data objects being understandable as a combination of an in-phase signal represented by the in-phase components and a quadrature signal represented by the quadrature components. A magnitude of the signal represented by an I value and Q value for a particular complex data object can be determined as the square root of the sum of the squares of the I and Q values. A phase of the signal represented by an I value and Q value for a particular complex data object can be determined as the arctangent of the Q value over the I value.

In accordance with one or more preferred implementations, a fast Fourier transform (FFT) algorithm is utilized to generate, based on a set of time-domain complex data objects for an IF signal, a set of frequency-domain complex data objects. Each frequency-domain complex data object can be characterized as corresponding to a distance bucket, with signal for a certain frequency indicating a detected object, or lack thereof, at a corresponding distance.

In accordance with one or more preferred implementations, an FMCW radar sensor can detect motion based on differences between a determined set of frequency-domain complex data objects for a received reflection of a first transmitted signal (e.g. chirp) and a determined set of frequency-domain complex data objects for a received reflection of a second transmitted signal (e.g. chirp).

In accordance with one or more preferred implementations a transmitted signal comprises a frame of one or more chirps. In accordance with one or more preferred implementations, for each chirp of a frame, a set of frequency-domain complex data objects is generated as described above. It will be appreciated that a particular frequency/distance bucket may be generated based on data for multiple objects at the same range, but different locations, and moving at different velocities. In accordance with one or more preferred implementations, a complex data object from a frequency-domain set indicates a magnitude and phase for the frequency/distance corresponding to that complex data object.

To attempt to distinguish between objects, an approach can be utilized in which, for each frequency/distance bucket, the frequency-domain complex data objects for that frequency/distance for each chirp of the frame are utilized to generate, using another FFT operation, a Doppler set of complex data objects that can resolve different objects.

In accordance with one or more preferred implementations, an FMCW radar sensor with multiple antennas determines an angle of arrival for a reflected signal based on a phase difference between a complex data object of a set of frequency-domain complex data objects for a first antenna and a corresponding complex data object of a set of frequency-domain complex data objects for a second antenna.

For example, consider an electromagnetic wave that represents the reflection off a first surface of a signal transmitted by a radar transmitter. The reflected wave is received at a first radar receiver and a second radar receiver. The electromagnetic wave travels a first distance d1 from the first surface to the first radar receiver, and a second distance d2 from the first surface to the second radar receiver, where the second distance is greater than the first distance by an amount $\Delta d = d2 - d1$.

The change in phase $\Delta \Phi$ that would be experienced over the additional $\Delta d$ distance, and thus the difference in phase between the signal received at the first radar receiver and the signal received at the second radar receiver can be found as two times pi times $\Delta d$ divided by the wavelength $\lambda$.

Assuming a planar wavefront, $\Delta d$ is equal to the spacing distance s between the first radar receiver and the second radar receiver multiplied times the sine of an angle of arrival $\theta$. Thus, the angle of arrival $\theta$ can be found as the arcsine of ((wavelength $\lambda$ times difference in phase $\Delta \Phi$) divided by (2 times pi times a spacing distance s between the first radar receiver and the second radar receiver)).

In various examples described herein, the output data of a PIR sensor and a radar sensor are fused and are input into a machine learning model (e.g., a supervised machine learning model, unsupervised machine learning model, etc.) that may be used to determine whether motion is detected in the monitored environment. The machine learning model may be trained using annotated training data that provides examples of positive motion events and negative motion events (together with the attending PIR and radar data). Accordingly, the machine learning model may learn common false positive and false negative scenarios and may thereby provide more accurate and useful motion detection.

Machine learning techniques, such as those described herein, are often used to form predictions, solve problems, recognize objects in image data for classification, etc. In various examples, machine learning models may perform better than rule-based systems and may be more adaptable as machine learning models may be improved over time by retraining the models as more and more data becomes available. Accordingly, machine learning techniques are often adaptive to changing conditions. Deep learning algorithms, such as neural networks, are often used to detect patterns in data and/or perform tasks.

Generally, in machine learned models, such as neural networks, parameters control activations in neurons (or nodes) within layers of the machine learned models. The weighted sum of activations of each neuron in a preceding layer may be input to an activation function (e.g., a sigmoid function, a rectified linear units (ReLu) function, etc.). The result determines the activation of a neuron in a subsequent layer. In addition, a bias value can be used to shift the output of the activation function to the left or right on the x-axis and thus may bias a neuron toward activation.

Generally, in machine learning models, such as neural networks, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent (or ascent) algorithm to incrementally adjust the weights to cause the most rapid decrease (or increase) to the output of the loss function. The method of updating the parameters of the machine learning model is often referred to as back propagation.

FIG. 1 is a diagram illustrating a system 100 including a motion detector 102 configured in communication with a camera device 120 and one or more non-transitory computer-readable memories 103, in accordance with various aspects of the present disclosure. In various examples, the computing device(s) implementing motion detector 102 may be configured in communication over a network 104. Although depicted as separate components in FIG. 1, the motion detector 102 may be part of the camera device 120. In some examples, the motion detector 102 may be implemented in one or more chips of camera device 120. For example, one or more of the techniques used by the motion detector 102 may be performed using an application specific integrated circuit (ASIC) and/or using a field programmable gate array (FPGA). In some other examples, various techniques of the motion detector 102 may be instantiated in software executed by one or more processors of the camera device 120 and/or of the motion detector 102. In yet other examples, the motion detector 102 may be instantiated using some combination of hardware and software.

Network 104 may be a communication network such as a local area network (LAN), a wide area network (such as the Internet), or some combination thereof. The one or more computing devices implementing the motion detector 102 may communicate with non-transitory computer-readable memory 103 (e.g., either locally or over network 104). The non-transitory computer-readable memories 103 may store instructions that may be effective to perform one or more of the various techniques described herein.

As shown in FIG. 1, motion detector 102 may comprise a PIR sensor 130 and a radar sensor 132. Nominally, motion detector 102 may operate in a first operation mode 140a. During first operation mode 140a the PIR sensor 130 may generate output samples (e.g., at 64 samples per second or some other frequency, depending on the desired implementation) representing output magnitude of the PIR sensor 130. The samples may be compared to a tunable threshold value. If a sample has a magnitude that exceeds the threshold value this may be indicative of possible motion and an interrupt may be generated. An interrupt generated either due to PIR sensor 130 detecting motion, radar sensor 132 detecting motion, or both, may cause the motion detector 102 to transition from the first operation mode 140a to the second operation mode 140b.

In the first operation mode 140a, the radar sensor 132 may use a transmitter (not shown in FIG. 1) to generate an output signal (e.g., a "chirp"). The radar sensor 132 may have one or more receivers that may receive the reflected signal. An RF mixer of the radar sensor 132 may mix the transmitted and reflected signal to determine a difference component signal. The difference component signal may be used, in the first operation mode 140a to determine if motion is detected. Generally, the radar sensor 132 may output Boolean values of 0 or 1 for each sample with one value (e.g., 0) indicating that no motion is detected and one value (e.g., 1) indicating that motion is detected. Various logic may be used to generate the Boolean values by the radar sensor 132 in the first operation mode 140a. For example, the Boolean values may be generated in response to a magnitude of the difference component signal exceeding a predefined threshold value. In some other examples, a difference in the magnitude of the difference component signal between consecutive (or non-consecutive) chirps or frames of transmitted data by the radar sensor 132 may be used to generate the Boolean values.

In various examples, radar motion sensors may be susceptible to noise (e.g., interference from other radio frequency signals in the environment). Accordingly, a single positive value (e.g., Boolean 1) may not be a strong predictor of motion in the environment. Accordingly, rather than generate an interrupt after only a single positive Boolean value, an interrupt may be generated upon a threshold number of positive Boolean values begin generated within a given time period (e.g., 3 positive results within 2 seconds, 5 positive results within 2.5 seconds, etc.). Upon determining that motion is present for greater than a given time threshold, the radar sensor 132 may generate an interrupt causing the motion detector 102 to transition from the first operation mode 140a to the second operation mode 140b. As previously described, an interrupt generated either due to PIR sensor 130 detecting motion, radar sensor 132 detecting motion, or both, may cause the motion detector 102 to transition from the first operation mode 140a to the second operation mode 140b.

During second operation mode 140b, the PIR sensor 130 may continue to generate magnitude values. The magnitude values output by the PIR sensor 130 may be sampled at any desired rate. In general, the magnitude values output by the PIR sensor 130 may be sampled over the same time period as the time period for which the frame difference data is determined for the radar sensor 132, as described in further detail below. As described in further detail below, the frame difference data may represent a difference in magnitude data that is associated with transmission of a first frame and a second frame by the radar sensor having two or more receivers. However, in various examples, instead of comparing the sampled magnitude values output by the PIR sensor 130 to a threshold value (as in the first operation mode 140a), in the second operation mode 140b, the output values over the first time period 150 may be combined with the frame difference data 154 output by the radar sensor (described in further detail below) at block 156 to generate input data for the first machine learning model 160.

During the second operation mode 140b, radar sensor 132 may use a transmitter to transmit frames representing an output signal. The frames may be transmitted at any desired cadence (e.g., one frame generated every 100 ms (10 Hz), every 200 ms (20 Hz), or at any other desired cadence) over any desired first time period (e.g., 800 ms, 1 s, etc.) (block 152). At least a first receiver and a second receiver of the radar sensor 132 may receive respective reflected signals for each transmitted frame. The received signals may be mixed with the transmitted signals to determine an intermediate frequency signal if. The signal if may be sampled by an analog to digital converter (ADC) of the radar sensor 132 at a desired sampling rate to generate a set of samples iq. Each iq sample may represent a complex number where iq includes a plurality of complex numbers indicating the magnitude and phase of the sample for a particular time j, where j is from time 1 to $j_{max}$ (the sampling period). An iq sample may take the form $(I_n+Q_n j)$ where I represents the magnitude value and Q is the phase for a sample n, or it may take the same form $(I_n+Q_n j)$ where a magnitude of the signal represented by an I value and Q value for a particular sample can be determined as the square root of the sum of the squares of the I and Q values. A phase of the signal represented by an I value and Q value for a particular sample can be determined as the arctangent of the Q value over the I value.

Radar sensor 132 may perform a Fourier Transform (e.g., a Fast Fourier Transform (FFT)) on the iq samples to determine a magnitude value or set of complex values (e.g. indicating a magnitude and phase) for each frequency, where each frequency corresponds to a distance from the receiver in the physical environment monitored by the radar sensor 132. The FFT may generate magnitude values for a desired number of frequency/distance bins. The number of frequency/distance bins may be selected according to the desired implementation. For ease of illustration, 60 frequency/distance bins are used in many of the examples described herein. However, any number of frequency/distance bins may be used in accordance with the desired implementation. After the FFT, radar sensor 132 may generate a vector $rx_1[n]$ for a first receiver and a vector $rx_2[n]$ for a second receiver (e.g., $rx_1[60]$ and $rx_2[60]$). These vectors may be averaged to determine an average vector between the first and second receiver for the first frame (e.g., $rxavg_1[60]$). This process may be repeated for each frame to generate $rxavg_2[60]$, $rxavg_3[60]$, . . . , $rxavg_m[60]$ where m is the number of frames generated and transmitted over the first time period (block 152).

Frame difference data (e.g., framedelta vectors) may be determined at block 154 as $framedelta_2[60]=|rxavg_1-rxavg_2[60]|$, etc., for each set of consecutive frames from 1 to m over the first time period. Each framedelta may be a vector representing the difference in magnitude between mixed intermediate frequency signals between consecutive (or non-consecutive, depending on the implementation) frames. In various examples, the framedelta vectors may be an array of magnitude values with each row representing a particular time step over the first time period. The magnitude values from the framedelta data (frame difference data determined at block 154) for the first time period may be combined with the PIR output values for the first time period (block 150) at block 156 and may be input into the first machine learning model 160.

The first machine learning model 160 may be trained using training data comprising labeled training instances that pair combined PIR values and framedelta data with labels indicating either a groundtruth motion event or non-motion event. However, in other examples, non-supervised approaches and/or weakly-supervised approaches may be used for the first machine learning model 160. For example, clustering techniques may be used to determine distinct clusters of the combined PIR values and framedelta data. Clusters may be associated with motion events or non-motion events. Accordingly, input data may be classified into a particular cluster and a motion prediction may be made based on the cluster. In some examples, smaller machine learning models (e.g., relatively shallow feed forward networks) may be advantageous as the model may be executing on a battery-powered camera device 120 which may be relatively compute and/or power constrained.

In any event, the first machine learning model 160 may generate prediction data during the first period of time 162. If the prediction data indicates that no motion is detected during the first period of time, processing may return from second operation mode 140b to the first operation mode 140a. In some examples, first operation mode 140a may be less power-intensive relative to second operation mode 140b due to lesser processing requirements. Conversely, if the prediction data indicates that motion is detected during the first period of time, the camera device 120 may be activated.

Upon activation of the camera device 120, downstream processing 164 may be initiated. For example, further motion detection processing pipelines and/or object detection pipelines may be initiated to further reduce false positives. For example, computer vision techniques (such as human detection algorithms, object detection algorithms, etc.) may be used to determine whether motion is present and/or whether the motion should be used to trigger video capture and/or streaming. In some examples, upon making a determination that video should be captured and/or streamed (based at least in part on the motion prediction during the first period of time 162 by motion detector 102), the camera device may begin capturing video, generating encoded video data (e.g., for storage or transmission), and/or sending encoded video to a remote computing device (not shown in FIG. 1), such as a remote server and/or a user device (e.g., a smart phone executing a companion application that is registered with the camera device 120). In some examples, the camera device 120 may continually capture a small amount of video stored in a rolling buffer (e.g., 2 seconds of video or less) so that events of interest captured while motion detection processing is occurring may be encoded and sent for viewing. In such examples, upon prediction data generated by the first machine learning model 160 indicating a motion event, the contents of the rolling buffer may be encoded and sent to one or more designated remote computing devices followed by live video streaming until a designated period of time after motion is no longer detected. The various operations of the motion detector 102 are described in further detail below in reference to FIGS. 2A-2D.

FIG. 2A depicts example processing steps and components of radar sensor 132 of the motion detector of FIG. 1, in accordance with various aspects of the present disclosure. As described above, in the second operation mode 140b, the radar sensor 132 may begin transmitting frames (e.g., transmitted frame signal 202). The transmitted frame signal 202 may reflect within the environment and reflected frame signal 204 may be received. As previously described, the radar sensor 132 may include multiple receivers and/or antennas. Accordingly, although only a single reflected frame signal 204 is shown in FIG. 2A, a reflected signal (for each transmitted frame) may be received by each distinct receiver/antenna of the radar sensor 132.

Mixer 206 may be a circuit that mixes the transmitted frame signal 202 with the reflected frame signal 204 to generate difference signal ($if_1$) 208 for receiver 1 (as well as a difference signal ($if_2$) for a second receiver (not shown in FIG. 2A)). The mixer 206 generates a product of the two input signals that includes new signals-one at the sum of the two input frequencies and one at the difference of the two input frequencies. The difference signal ($if_1$) 208 may be the difference component of the mixer 206 output. The difference signal ($if_1$) 208 may be sampled by ADC 210 to generate iq samples 212 for the first frame. Although the various steps in FIG. 2A are shown and described for only one receiver/antenna, it should be noted that this process may be performed for a second receiver/antenna of the radar sensor 132. The samples iq include a plurality of complex numbers representing the magnitude and phase of the sample for a particular time j, where j is from time 1 to $j_{max}$ (the sampling period). The iq samples may be complex numbers having the form $(I_n + Q_n j)$ where I represents the magnitude value and Q is the phase for a sample n.

Figure 2B:
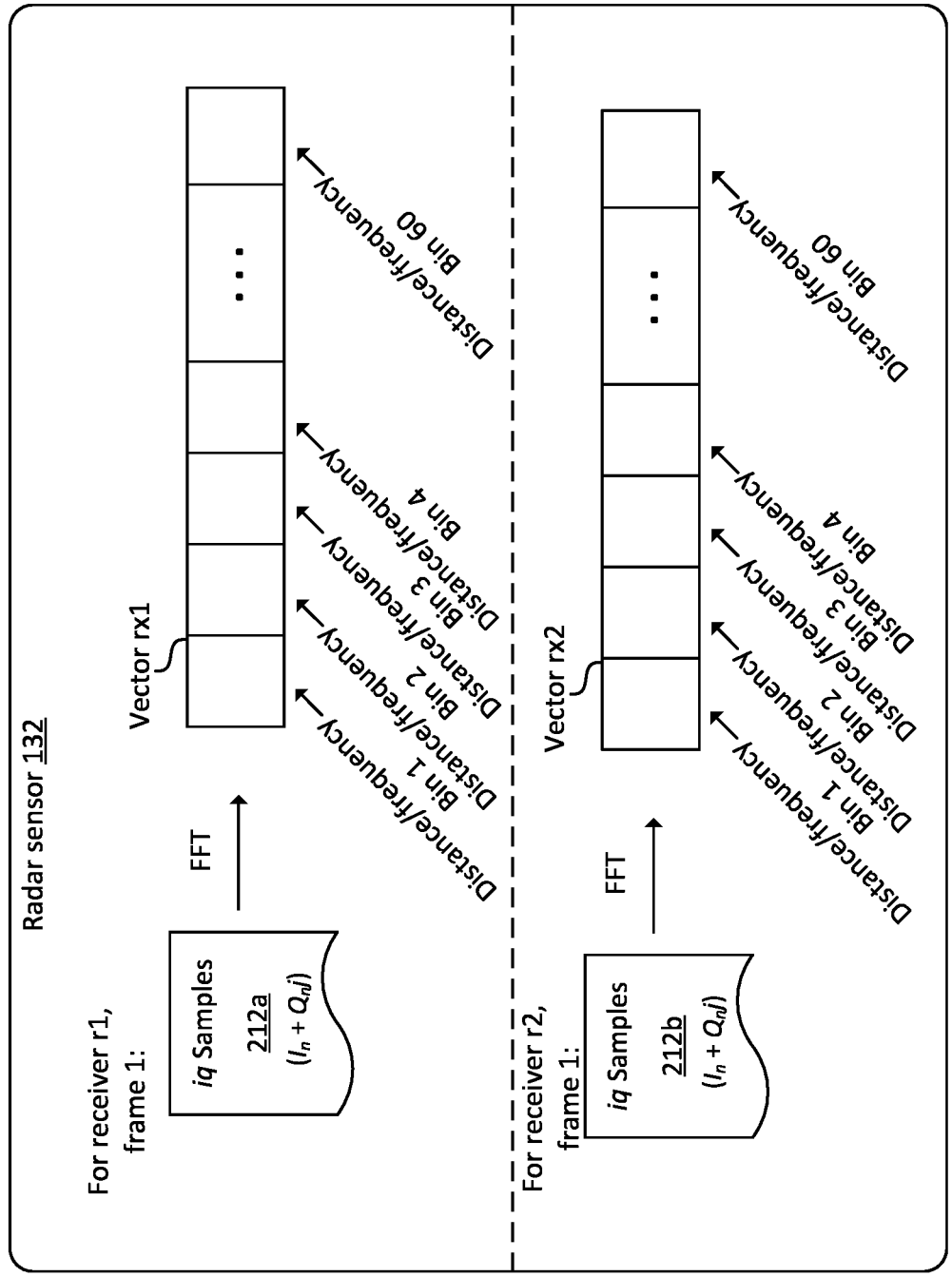
FIG. 2B depicts additional example processing steps of the radar sensor of FIG. 2A, in accordance with various aspects of the present disclosure.

Processing may continue at FIG. 2B which depicts additional example processing steps of the radar sensor of FIG. 2A, in accordance with various aspects of the present disclosure. As depicted in FIG. 2B, FFT may be performed on the iq samples 212a, 212b (for a first receiver r1 and a second receiver r2, respectively) to generate a vector $rx_1[60]$ and a vector $rx_2[60]$. Each element of the vectors $rx_1$ and $rx_2$ may correspond to a different distance/frequency bin. The number of elements (and thus the number of distance/frequency bins) shown in the example of FIG. 2B is 60, however any number of bins may be used in accordance with the desired implementation. The value of each element of the vectors $rx_1$ and $rx_2$ corresponds to the magnitude of the iq sample for that frequency/distance. Accordingly, vector $rx_1[60]$ is a vector with a respective magnitude value for each frequency/distance bin among 60 total bins. $rx_1[60]$ corresponds to the first receiver for a first frame transmitted by the radar sensor 132. Similarly, $rx_2[60]$ is a vector generated for the second receiver for the first frame transmitted by the radar sensor 132.

Figure 2C:
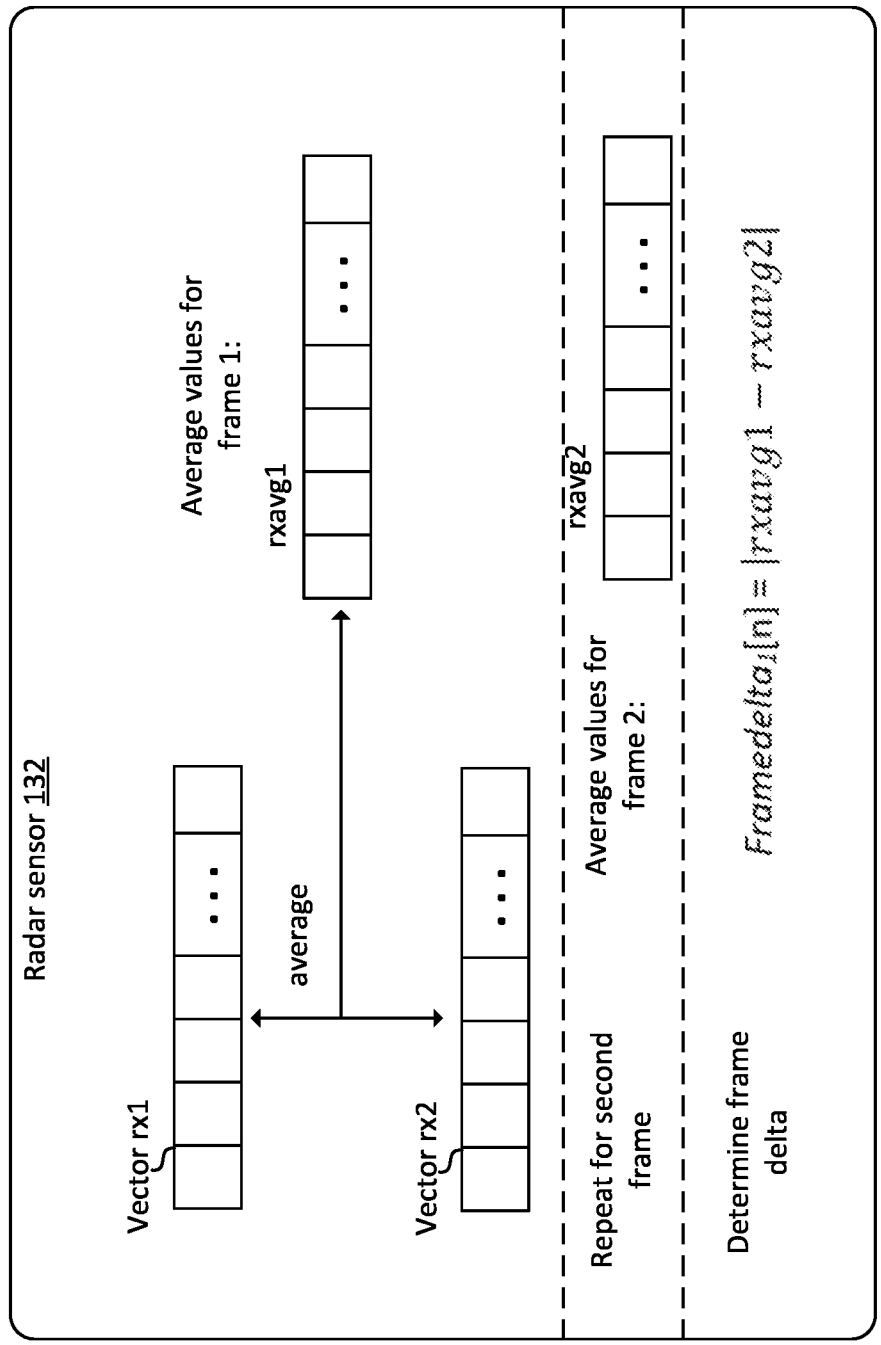
FIG. 2C depicts additional example processing steps of the radar sensor of FIG. 2A, in accordance with various aspects of the present disclosure.
Figure 2D:
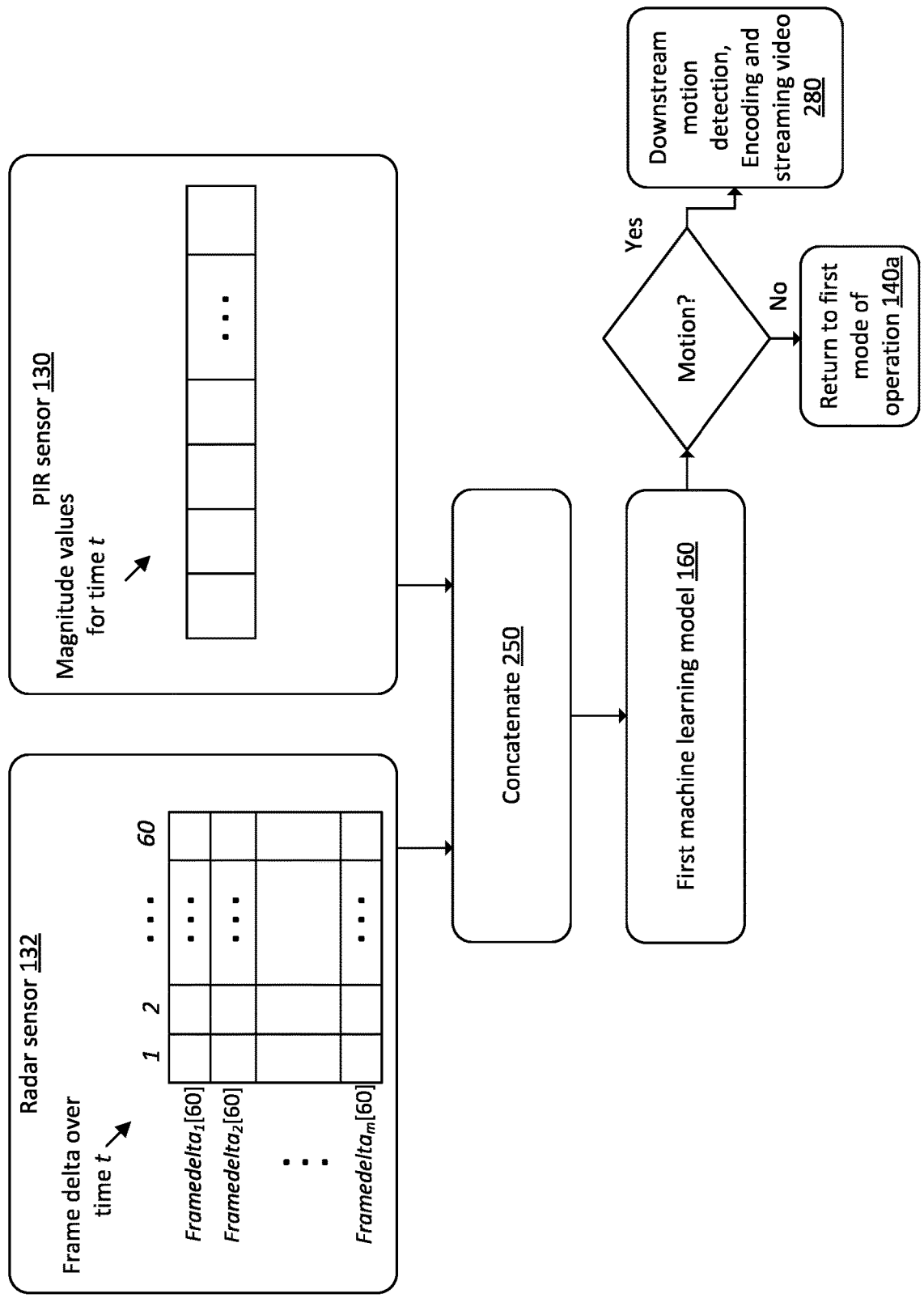
FIG. 2D depicts additional processing steps that may be used by the motion detector of FIG. 1 to detect motion, in accordance with various aspects of the present disclosure.

Processing may continue at FIG. 2C, at which an average of the vector $rx_1$ and $rx_2$ (the vectors generated for a first receiver and a second receiver for a given frame) may be determined (e.g., the per-element average magnitude values). In the example shown in FIG. 2C, the average vector for frame 1 is denoted as $rxavg_1$. This process is repeated to generate the average vector for frame 2 ($rxavg_2$) and for each subsequent frame transmitted during the relevant period of time (e.g., the first time period of FIG. 1). Frame delta vectors (e.g., frame difference data) may be determined as the difference between the average vectors for each frame (e.g., $framedelta_2[60] = |rxavg_1 - rxavg_2[60]|$) to generate a framedelta vector representing the difference between two frames. This may be performed for different consecutive frames (or non-consecutive frames) transmitted over the first time period t. As shown in FIG. 2D, an array may be generated with m framedelta vectors, where the m framedelta vectors are determined (e.g., at evenly-spaced intervals) over the time period t. For example, frames may be transmitted at 10 Hz, with one frame being generated every 100 ms over a time period t=800 ms. In such an example, eight framedelta vectors may be determined. In an example with 60 element vectors, the eight framedelta vectors may include 480 values.

Over the same time period t, the PIR sensor 130 may generate magnitude values that may be sampled at any desired sampling rate over the time period t. For example, a particular PIR sensor 130 may generate samples at 64 samples per second. If the time period t=800 ms, 51 PIR samples may be used (i.e., 64*0.8=51.2) over the time period t.

The PIR magnitude values may be concatenated (or otherwise combined) with the values from the framedelta array at block 250 to generate input data for the first machine learning model 160. The first machine learning model 160 may be trained to predict whether motion is present in the scene from the input combined PIR data and frame difference data (e.g., the values from the array of framedelta vectors). In some examples, the first machine learning model 160 may be trained using samples of such combined values paired with ground truth labels indicating motion events or no-motion events. Use of the first machine learning model 160 may be advantageous in that the first machine learning model 160 may learn correlations in the combined PIR data and radar data that may be strongly associated with motion events or non-motion events and which may otherwise be associated with inaccurate predictions (e.g., which may be a false positive or false negative) using conventional motion detection techniques. At block 280, if the output of the first machine learning model 160 indicates motion, the camera device may be "woken up" to enter an active state. Downstream motion detection processing pipelines may be initiated to further reduce false positives. For example, computer vision techniques (such as human detection algorithms, object detection algorithms, etc.) may be used to determine whether motion is present and/or whether the motion should be used to trigger video capture and/or streaming. Upon determining that the motion triggers video capture/encoding, video may be encoded and streaming of the encoded video may be initiated to one or more remote devices.

Figure 3:
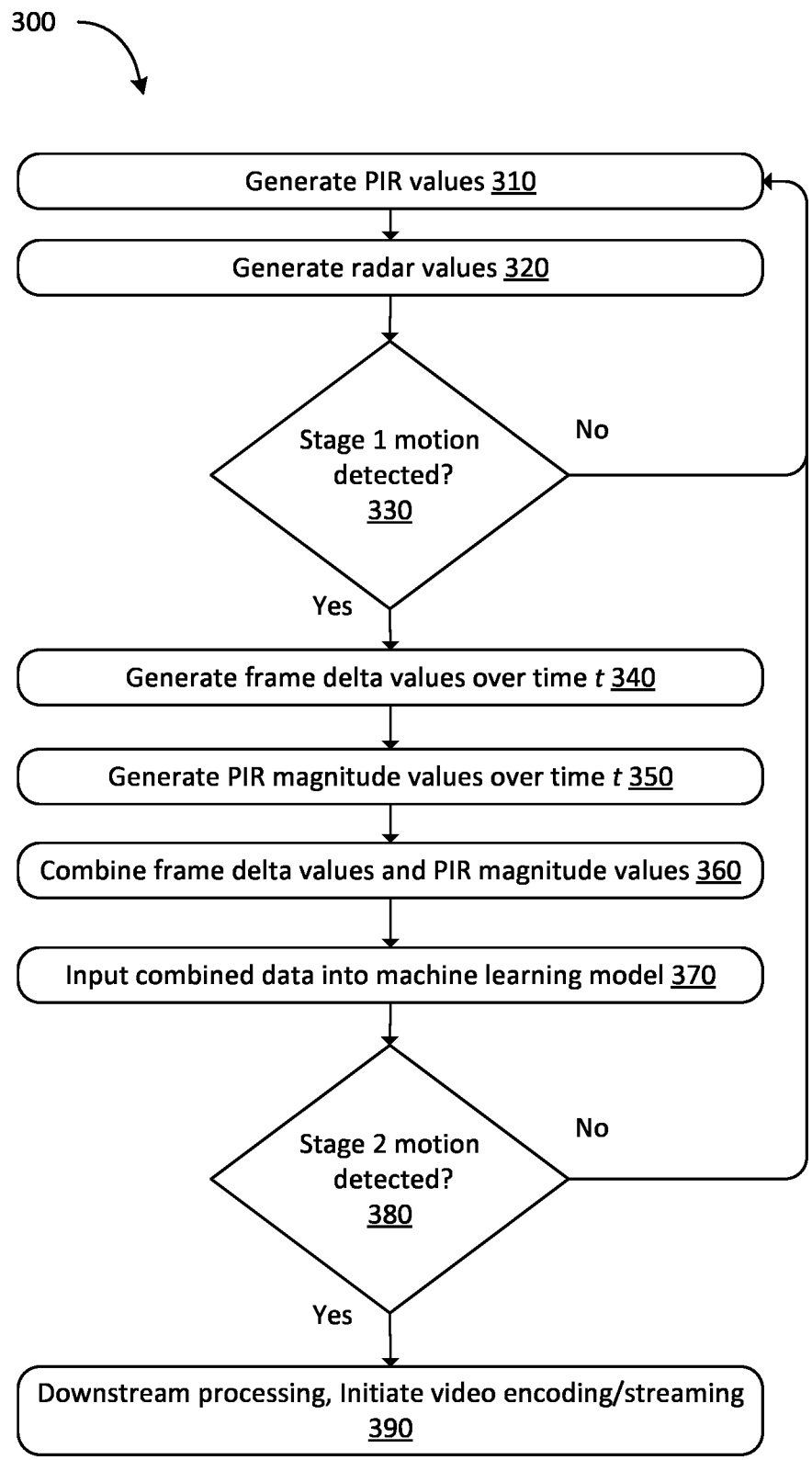
FIG. 3 depicts an example process that may be used to detect motion using the motion detector of FIG. 1, in accordance with various aspects of the present disclosure.

FIG. 3 depicts an example process 300 that may be used to detect motion using the motion detector of FIG. 1, in accordance with various aspects of the present disclosure. The actions of the process 300 may represent a series of instructions comprising computer readable machine code executable by a processing unit of motion detector 102 and/or camera device 120, although various operations may be implemented in hardware. In various examples, the computer readable machine codes may be comprised of instructions selected from a native instruction set of the processor(s) and/or an operating system of the computing device.

Process 300 may begin at action 310, at which PIR values may be generated by a PIR sensor. For example, PIR sensor 130 may generate magnitude values representing the difference between different PIR sensor halves or regions. The particular PIR sensor may be associated with a configurable threshold value that may be used to detect motion. Processing may continue at action 320, at which radar values may be generated. In various examples, a radar sensor, such as radar sensor 132, may transmit signals and may receive signals reflected from the environment. The radar sensor may use the Doppler effect to determine movement in the monitored environment. For example, the radar sensor may mix a transmitted radio signal with a signal from an antenna that has received the transmitted signal after it has reflected off of surfaces and/or objects within the environment (e.g., an environment external to the RF motion sensor that is being monitored by the RF motion sensor). The transmitted and received signals may be input into an RF mixer that multiplies the two inputs together. The result of this multiplication is an output signal that, in the frequency domain, includes a signal component at the sum of the two input frequencies (a "sum component signal") and a signal component at the difference of the two input frequencies (a "difference component signal"). By measuring the amplitude and frequency of difference component signal of the two mixed input frequencies, the movement of objects in the field of the antennas can be detected. For example, the radar sensor 132 may transmit signals and determine Doppler shifts (changes in frequency) for detection of movement. The radar sensor 132 may output Boolean values indicating whether motion is detected. In some examples, the radar sensor, in the first mode of operation, may require Boolean values indicating motion for a particular time period (in order to reduce false positives) in order to generate an interrupt to switch to the second mode of operation. For example, the radar sensor may request X number of Boolean values indicating motion over a Y time period. In another example, the radar sensor may require a certain number of consecutive positive Boolean values indicating motion without any intervening negative Boolean values or only positive Boolean values during a specified time period in order to generate the interrupt.

A determination may be made at action 330 whether stage 1 motion has been detected. Stage 1 motion refers to whether motion has been detected either due to a PIR magnitude value exceeding the relevant PIR magnitude threshold value or due to the radar sensor detecting motion as described above based on the Boolean values. When motion is detected during the first mode of operation (e.g., "Stage 1" in FIG. 3), the second mode of operation (e.g., Stage 2) may be initiated at action 340. Conversely, if no motion is detected at action 330, processing may return to action 310 and the PIR sensor and radar sensor may continue monitoring the environment for motion using the Stage 1 techniques.

When an interrupt is generated, processing may transition to Stage 2 at action 340 and frame delta values may be generated over time t. For example, framedelta vectors may be generated for each pair of frames transmitted by radar sensor 132 over the time period t, as described above in reference to FIGS. 2A-2D. At action 350, the PIR sensor 130 may continue to generate PIR magnitude values over the time period t.

Processing may continue at action 360, at which the frame delta values (e.g., the values from the framedelta vectors) and the PIR magnitude values may be combined (e.g., concatenated) to generate combined data for the machine learning model. At action 370, the combined data may be input into the machine learning model. The machine learning model may generate an output that represents a predicted motion event or a predicted non-motion event.

At action 380, a determination may be made as to whether a motion event is predicted. If not, processing may return to Stage 1 processing (e.g., first operation mode 140a) at action 310. If, at action 380, motion is detected, processing may continue to action 390, at which point the camera device 120 may transition from a low-power motion detection mode to a an active state. For example, downstream motion detection and/or object detection processing pipelines may be initiated to further reduce false positives. For example, computer vision techniques (such as human detection algorithms, object detection algorithms, etc.) may be used to determine whether motion is present and/or whether the motion should be used to trigger video capture and/or streaming. Upon determining that the motion triggers video capture/encoding, video encoding and/or streaming may be initiated, as described above.

Figure 4:
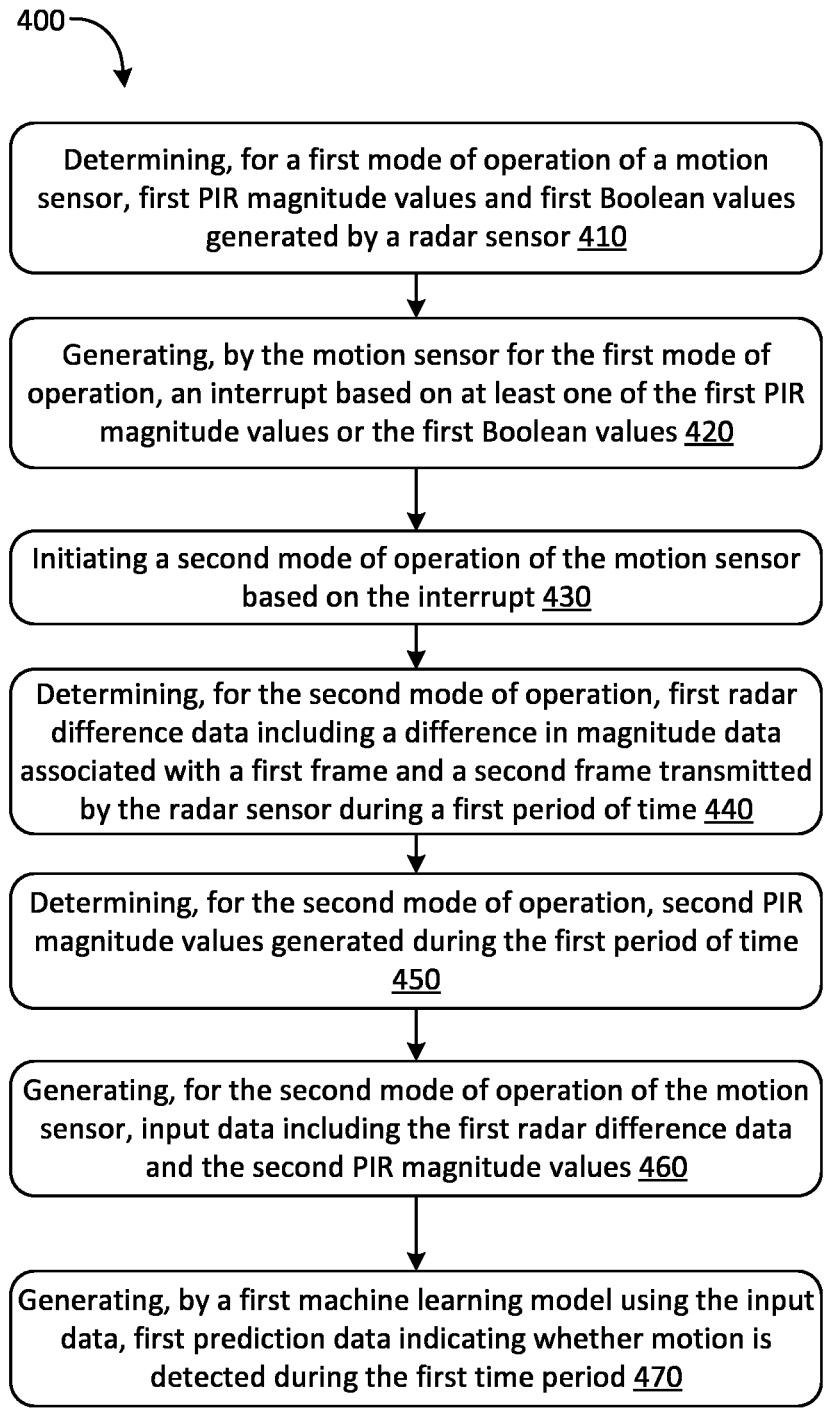
FIG. 4 depicts another example process that may be used to detect motion using the motion detector of FIG. 1, in accordance with various embodiments of the present disclosure.

FIG. 4 depicts another example process 400 that may be used to detect motion using the motion detector of FIG. 1, in accordance with various embodiments of the present disclosure. The actions of the process 400 may represent a series of instructions comprising computer readable machine code executable by a processing unit of an image signal processor, although various operations may be implemented in hardware. In various examples, the computer readable machine codes may be comprised of instructions selected from a native instruction set of the processor(s) and/or an operating system of the computing device.

Process 400 may begin at action 410, at which first PIR magnitude values may be determined for a first mode of operation of a motion sensor (e.g., PIR sensor 130 operating in first operation mode 140a of motion detector 102). Additionally, at action 410, first Boolean values may be generated by a radar sensor (e.g., radar sensor 132 operating in first operation mode 140a of motion detector 102).

Processing may continue at action 420, at which an interrupt may be generated by the motion sensor for the first mode of operation. The interrupt may be generated based at least in part on one of the first PIR magnitude values or the first Boolean values. For example, if one or more of the PIR magnitude values exceeds a configurable PIR magnitude value threshold, an interrupt may be generated. In another example, if the radar sensor 132 generates a Boolean value indicating motion (or a threshold number of Boolean values indicating motion during a particular time period) an interrupt may be generated.

Processing may continue at action 430, at which a second mode of operation of the motion sensor may be initiated based on the interrupt. Processing may continue at action 440, at which first radar difference data that includes a difference in magnitude data associated with a first frame and a second frame transmitted by the radar sensor during a first period of time may be determined for the second mode of operation. The first radar difference data may be, for example, a framedelta vector generated as described above in reference to FIGS. 2A-2D.

Processing may continue at action 450, at which second PIR magnitude values generated during the first period of time may be determined. For example, the motion detector 102 may sample PIR magnitude values from among PIR magnitude values generated by the PIR sensor 130 during the first period of time. In this way, the sampled PIR magnitude values may be correlated with the first radar difference data determined during the first period of time.

Processing may continue at action 460, at which input data that includes the first radar difference data and the second PIR magnitude values may be generated for the second mode of operation of the motion sensor. In various examples, the different magnitude values of the first radar difference data (e.g., the per-element values of the one or more framedelta vectors generated by radar sensor 132) may be concatenated, or otherwise combined, with the second PIR magnitude values sampled during the first period of time to generate input data for input into a machine learning classifier (e.g., the first machine learning model) trained to classify such data as representing a motion event or a non-motion event. At action 470, the input data generated at action 460 may be input into the first machine learning model. The first machine learning model may generate first prediction data indicating whether motion is detected during the first time period. As previously described, the first machine learning model may be trained using supervised or unsupervised approaches, depending on the desired implementation.

In accordance with one or more preferred implementations, audio data generated using one or more microphones of an electronic device is additionally used as input to a machine learning model together with PIR data and radar difference data. In accordance with one or more preferred implementations, an electronic device may generate audio data using one or more microphones (e.g. in response to an interrupt received from a radar sensor or a PIR sensor), and such audio data may be used as input to a machine learning model (e.g. together with PIR data and radar data) to determine whether to undertake some further action (e.g. whether to power up a camera, begin recording, transmit an alert, etc.)

Figure 5:
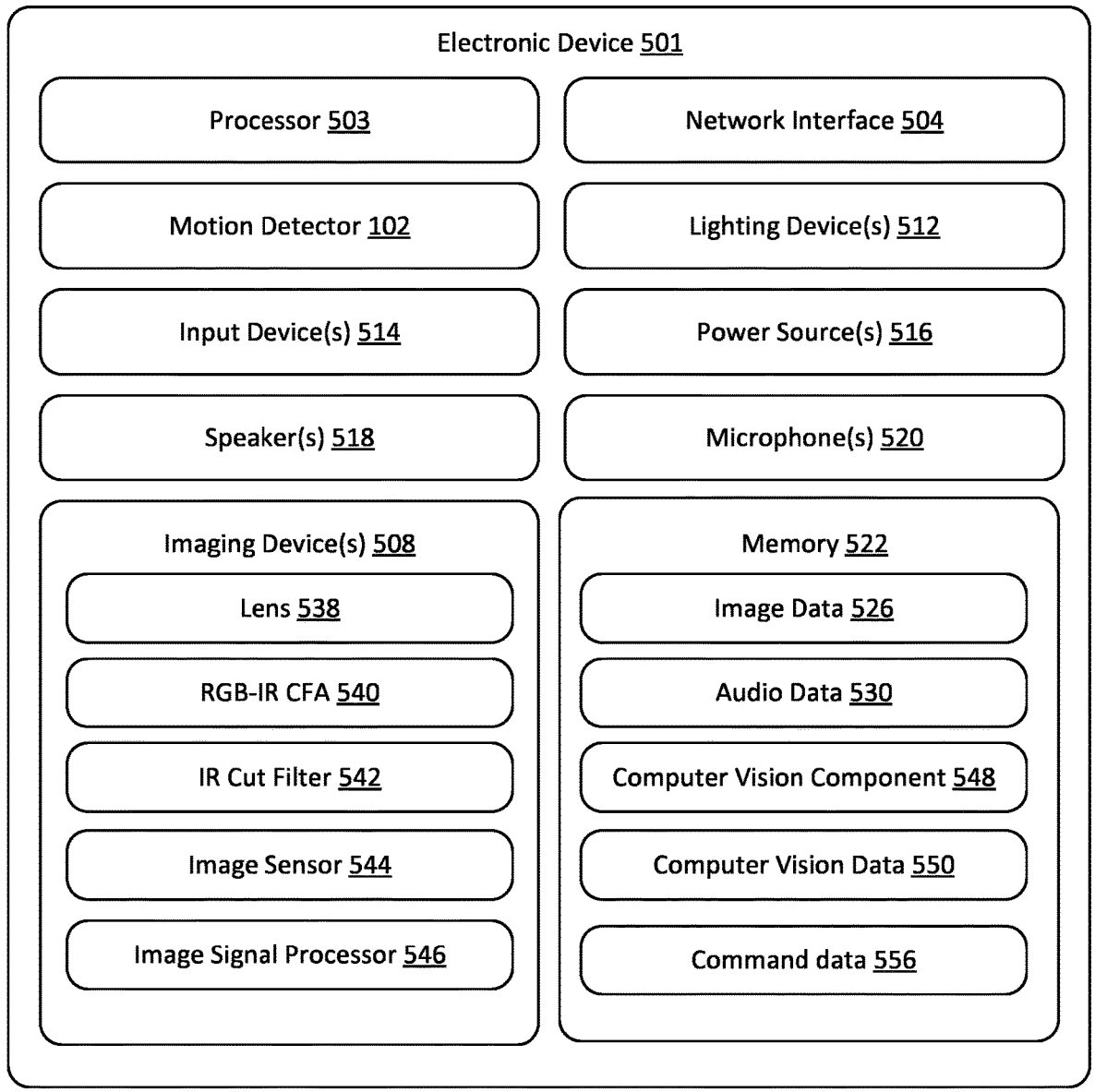
FIG. 5 depicts an example device that may implement a motion detector, in accordance with various aspects of the present disclosure.

FIG. 5 depicts an example device that may implement a motion detector, in accordance with various aspects of the present disclosure. As shown, the electronic device 501 may include one or more processors 503, one or more network interfaces 504, one or more motion sensors 102, one or more imaging devices 508, one or more lighting devices 512, one or more input devices 514, one or more power sources 516, one or more speakers 518, one or more microphones 520, and memory 522. In various examples, the electronic device 501 may be an example of a camera device, such as camera device 120 shown and described in reference to FIG. 1.

As described herein, the motion detector 102 may include one or more (alone or in combination) different types of motion sensors. For example, in some embodiments, the motion detector 102 may comprise passive infrared (PIR) motion sensors, which may be secured on or within a PIR sensor holder that may reside behind a lens (e.g., a Fresnel lens). As previously described, the PIR sensors may detect IR radiation in a field of view, and produce an output signal (typically a voltage) that changes as the amount of IR radiation in the field of view changes. The amount of voltage in the output signal may be compared, by the processor(s) 503, for example, to one or more threshold voltage values to determine if the amount of voltage in the output signal is indicative of motion, and/or if the amount of voltage in the output signal is indicative of motion of an object that is to be captured by the imaging device(s) 508. In some examples, the processor(s) 503 may determine the distance based on the amount of voltage in the output signal. Additionally, or alternatively, in some examples, the processor(s) 503 may determine the distance based on which motion sensor 102 detected the object.

Although the above discussion of the motion detector 102 primarily relates to PIR sensors, depending on the example, the motion detector 102 may include additional and/or alternate sensor types that produce output signals including alternative data types. For example, and without limitation, the output signal may include an amount of voltage change based at least in part on the presence of infrared radiation in a field of view of an active infrared (AIR) sensor, the output signal may include phase shift data from a microwave-type radio frequency motion sensor, the output signal may include doppler shift data from an ultrasonic-type motion sensor, the output signal may include radio wave disturbance from a tomographic-type motion sensor, and/or the output signal may include other data types for other sensor types that may be used as the motion detector 102. In at least some examples, the motion detector 102 may include radar sensor 132 and PIR sensor 130. Radar sensor 132 may include a transmitter, two or more receivers (e.g., with corresponding antennas), a mixer, an ADC, and/or other electronics configured to perform the various operations described herein. In various examples, circuitry may be included in the electronic device 501 and/or in the image signal processor 546 that may be effective to perform the various motion detection techniques described herein. In various examples, a PIR sensor, radar sensor, or other motion sensor may be used to perform coarse motion detection (e.g., in first operation mode 140*a*). Once the PIR sensor or other motion sensor is triggered, other motion sensing techniques (e.g., the motion detection techniques described above in reference to FIGS. 2A-2D) and/or CV-based object detection) may be triggered (e.g., in second operation mode 140*b*).

An imaging device 508 may include any device that includes an image sensor 544, such as a charge-coupled device (CCD) and/or an active-pixel sensor (CMOS sensor), that is capable of generating image data 526 (which may represent, and/or include, the frames of image data described herein), representing one or more images (e.g., a video). The imaging device 508 may include a lens 538 that is effective to focus light on the image sensor 544. The light may be filtered by an RGB color filter array (CFA) 540 (e.g., a Bayer CFA) or an RGB-IR CFA. In one aspect of the present disclosure, the image sensor 544 may comprise a complementary metal-oxide semiconductor (CMOS) array and may be capable of recording high definition (e.g., 722p, 1800p, 4K, 8K, etc.) image and/or video files. The image sensor 544 may comprise a plurality of photosensors that may transform light into electrical signals. Such electrical signals may be represented by numerical values (e.g., floating point numbers) that may be processed using the image signal processor 546. Each photosensor of the image sensor 544 corresponds to a pixel in a frame of image data captured by the image sensor. In other words, the light information captured by the image sensor is represented as pixel values (e.g., a respective pixel value captured by each photosensor/pixel of the image sensor). Accordingly, each pixel in a frame of image data typically corresponds to one photosensor and the pixels in a frame are likewise arranged in a grid. The pixel value of each pixel represents the light captured by the corresponding photosensor during image capture.

In some other examples, the image sensor may be coated with a dual band-pass filter that has a passband at about 900 nm to allow IR color reproduction during the day and also to allow IR light detection when the imaging device(s) 508 are in night mode. In some examples, the electronic device 501 may include an IR cut filter 542 to filter out infrared light from the light path of the photosensors when the electronic device 501 is configured in day mode. The IR cut filter 542 may be removed from the light path such that infrared light may reach the photosensors when the electronic device 501 is configured in night mode.

The imaging device 508 may include a separate image signal processor 546, or the processor(s) 503 may perform the camera processing functionality. The processor(s) 503 (and/or camera processor) may include an encoding and compression chip. In some embodiments, the processor(s) 503 (and/or the camera processor) may comprise a bridge processor. The processor(s) 503 (and/or the camera processor) may process video recorded by the image sensor and may transform this data into a form suitable for transfer by the network interface(s) 504. In various examples, the imaging device 508 also includes memory, such as volatile memory that may be used when data is being buffered or encoded by the processor(s) 503 (and/or the camera processor). For example, in certain embodiments the camera memory may comprise synchronous dynamic random-access memory (SD RAM).

The lighting device(s) 512 may be one or more light-emitting diodes capable of producing visible light and/or infrared light when supplied with power (e.g., to enable night vision). In some embodiments, when activated, the lighting device(s) 512 illuminates a light pipe. In some examples, the electronic device 501 uses the lighting device(s) 512 to illuminate specific components of the electronic device 501, such as the input device(s) 514. This way, users are able to easily see the components when proximate to the electronic device 501.

An input device 514 may include, but is not limited to, a button, a touch-sensitive surface, a switch, a slider, and/or any other type of device that allows a user to provide input to the electronic device 501. For example, if the electronic device 501 includes a doorbell, then the input device 514 may include a doorbell button. In some examples, based on receiving an input, the processor(s) 503 may receive a signal from the input device 514 and use the signal to determine that the input device 514 received the input. Additionally, the processor(s) 503 may generate input data representing the input received by the input device(s) 514. For example, the input data may represent the type of input (e.g., a push to a button), a time that the input occurred, and/or the like.

The power source(s) 516 may include one or more batteries that provide power to the electronic device 501. However, in other examples, the electronic device 501 may not include the power source(s) 516. In such examples, the electronic device 501 may be powered using a source of external AC (alternating-current) power, such as a household AC power supply (alternatively referred to herein as "AC mains" or "wall power"). The AC power may have a voltage in the range of 112-220 VAC, for example. The incoming AC power may be received by an AC/DC adapter (not shown), which may convert the incoming AC power to DC (direct-current) and may step down the voltage from 112-220 VAC to a lower output voltage of about 12 VDC and an output current of about 2 A, for example. In various embodiments, the output of the AC/DC adapter is in a range from about 9 V to about 15 V and in a range from about 0.5 A to about 5 A. These voltages and currents are examples provided for illustration and are not intended to be limiting.

The speaker(s) 518 may be any electromechanical device capable of producing sound in response to an electrical signal input. The microphone(s) 520 may be an acoustic-to-electric transducer or sensor capable of converting sound waves into audio data 530 representing the sound. The speaker(s) 518 and/or microphone(s) 520 may be coupled to an audio CODEC to enable digital audio received by user devices to be decompressed and output by the speaker(s) 518 and/or to enable audio data captured by the microphone(s) 520 to be compressed into digital audio data 530. In some examples, the electronic device 501 includes the speaker(s) 518 and/or the microphone(s) 520 so that the user associated with the electronic device 501 can communicate with one or more other users located proximate to the electronic device 501. For example, the microphone(s) 520 may be used to generate audio data representing the speech of the one or more other users, which is then sent to the camera device. Additionally, the speaker(s) 518 may be configured to output user speech of the user, where the user's user speech may also be represented by audio data 530.

In some examples, the electronic device 501 determines that the start of the video is the first frame of the video. In some examples, such as when the electronic device 501 continuously generates the image data (e.g., the electronic device 501 does not turn off the imaging device(s) 508), the start of the video corresponds to the portion of the video that the imaging device(s) 508 were generating right after detecting an event. For example, the start of the video may correspond to the first frame of the video after detecting the event. In other examples, such as when the electronic device 501 does not continuously generate the image data 526 (e.g., the electronic device 501 turns off the imaging device(s) 508 until detecting an event such as a motion event), the start of the video corresponds to the first frame of the video that is generated by the imaging device(s) 508.

As further illustrated in the example of FIG. 5, the electronic device 501 may include the computer-vision component 548. The computer-vision component 548 may be configured to analyze the image data 526 using one or more computer-vision techniques and output computer-vision data 550 based on the analysis. The computer-vision data 550 may represent information, such as the presence of an object represented by the image data 526, the type of object represented by the image data 526, locations of the object relative to the electronic device 501, a direction of movement of the object, a velocity of the object, and/or any other type of information. As described herein, the type of object may include, but is not limited to, a person, an animal (e.g., a dog, a cat, a bird, etc.), a car, a tree, a wall, and/or any other type of object. In some examples, the computer-vision data 550 may further represent a bounding box indicating the respective location of each object represented by the image data 526.

For example, the computer-vision component 548 may analyze the image data 526 using one or more computer-vision techniques such as, but not limited to, object detection technique(s), object tracking technique(s), semantic segmentation technique(s), instance segmentation technique(s), object co-segmentation techniques, and/or any other computer vision technique(s). Computer-vision analysis includes methods for acquiring, processing, analyzing, and understanding digital images, such as by extracting high-dimensional data from the real world in order to produce numerical or symbolic information. This information is then used to identify object(s) represented in the image, locations of the object(s), a respective velocity of each object, and/or the like.

For a first example of performing computer-vision analysis, the computer-vision component 548 may use image segmentation technique(s) that use the computer-vision analysis to locate objects and boundaries (e.g., lines, curves, etc.) in images. Image segmentation may further assign labels to the segments, where segments that include the same label also include the same characteristics. As described herein, the one or more image segmentation techniques may include, but are not limited to, clustering technique(s), compression-based technique(s), histogram-based technique(s), edge detection technique(s), dual clustering technique(s), multi-scale segmentation technique(s), and/or any other type of image segmentation technique that may be use to segment the frame(s) of the video. In various examples, computer vision component 548 may be used to evaluate cropped activity zones in which motion has been detected using the motion detection techniques described herein. In various examples, upon detecting an object of interest in the cropped activity zone, the electronic device may begin encoding and transmitting captured video to one or more remote devices.

Compression-based technique(s) attempts to find patterns in an image and any regularity in the image can then be compressed. The compression-based technique(s) describe each segment (e.g., portion) by its texture and boundary shape, where each component is modeled by a probability distribution function and its coding length. The goal of the compression-based technique(s) is to find the segmentation which produces the shortest coding length. This may be achieved by a simple agglomerative clustering method.

Histogram-based technique(s) compute a histogram from all of the pixels in the image, where the peaks and values in the histogram are used to locate the clusters (e.g., portions) in the image. In some instances, color and intensity can be used as the measure of the clusters. In some instances, the histogram-based technique(s) may recursively apply the histogram-seeking method to clusters in the image in order to divide the clusters into smaller clusters. This operation may be repeated until no more clusters are formed.

Edge detection technique(s) use region boundaries and edges that are closely related, since there is often a sharp adjustment in intensity at the region boundaries. As such, the edge detection technique(s) use the region boundaries to segment an image. In some instances, the edge detection technique(s) use image detectors to identify the region boundaries.

Dual clustering technique(s) uses a combination of three characteristics of an image: partition of the image based on histogram analysis is checked by high compactness of the clusters, and high gradients of their borders. The dual clustering technique(s) use two spaces, one space is a one-dimensional histogram of brightness and a second space is a dual three-dimensional space of the original image. The first space allows the dual clustering technique(s) to measure how compactly the brightness of the image is distributed by calculating a minimal clustering. The clustering technique(s) use the two spaces to identify objects within the image and segment the image using the objects.

For a second example of performing computer-vision analysis, the computer-vision component 548 may use object detection technique(s) that use computer-vision analysis to perform informative region selection, features extraction, and then classification of object(s) represented by the image data 526. Informative region selection may include selecting different portions (e.g., windows) of an image represented by the image data for analysis. Feature extraction may then include extracting visual features of the object(s) located within the portions of the image in order to provide a semantic and robust representation of the object(s). Finally, classification may include classifying the type(s) of object(s) based on the extracted features for the object(s). In some examples, the object detection technique(s) may include machine learning technique(s), such as a Viola-Jones object detection technique, a scale-invariant feature transform technique, a histogram of oriented gradients features technique, and/or the like. Additionally, and/or alternatively, in some examples, the object detection technique(s) may include deep learning approaches, such as region proposal technique(s) (e.g., CNN technique(s)), you only look once technique(s), deformable convolutional networks technique(s), ad/or the like.

The electronic device 501 may also store command data 556. In some circumstances, a user of the electronic device 501 may want to receive a live view from the electronic device 501. The command data 556 may represent an identifier associated with the electronic device 501, a command to generate the image data 526, a command to send the image data 526, and/or the like. In some examples, the electronic device 501 may then analyze the command data 556 and, based on the identifier, determine that the command data 556 is directed to the electronic device 501. For example, the electronic device 501 may match the identifier represented by the command data 556 to an identifier associated with, and stored by, the electronic device 501. Additionally, the electronic device 501 may cause the imaging device(s) 508 to begin generating the image data 526 (e.g., if the imaging device(s) 508 are not already generating the image data 526) and send the image data 526 to the one or more computing devices implementing the motion detector 102, the camera device, and/or another device.

As used herein, a processor may include multiple processors and/or a processor having multiple cores. Further, the processor(s) may comprise one or more cores of different types. For example, the processor(s) may include application processor units, graphic processing units, and so forth. In one instance, the processor(s) may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

Memory may include volatile and nonvolatile memory, removable and non-removable media implemented in any method or technology for storage of information, such as computer-readable instructions, data structures, program component, or other data. The memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic instance, CRSM may include random access memory ("RAM") and Flash memory. In other instances, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the memory, or the same functionality may alternatively be implemented in hardware, firmware, application specific integrated circuits, field programmable gate arrays, or as a system on a chip (SoC). In addition, while not illustrated, the memory may include at least one operating system (OS) component that is configured to manage hardware resource devices such as the network interface(s), the I/O devices of the respective apparatuses, and so forth, and provide various services to applications or components executing on the processor(s). Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

Network interface(s) may enable data to be communicated between electronic devices. The network interface(s) may include one or more network interface controllers (NICs) or other types of transceiver devices to send and receive messages over network(s). For instance, the network interface(s) may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, the network interface(s) may include a wide area network (WAN) component to enable message over a wide area network.

Among other potential benefits, a system in accordance with the present disclosure may conserve power consumption by reducing video capture, image capture, and/or streaming from wireless camera devices resulting from insignificant motion that is unlikely to be of interest to a user. For example, detection of motion by a motion sensor of a battery-powered camera device may be used to trigger video capture and/or streaming by the camera device. However, as described herein, motion sensors may be triggered by insignificant motion, such as ceiling fans, pets, wind blowing various objects, passing cars, etc. Accordingly, the battery of a battery-powered camera device may be drained at an increased rate due to capture of such insignificant events. Additionally, unwanted notifications may be sent to a user of the camera system related to the insignificant motion triggers. Accordingly, as described herein, using a multi-staged approach whereby a PIR sensor and a radar sensor are used to generate environment data that may then be input into a machine learning classifier to detect motion may reduce false positives (and false negatives) and conserve battery power. Additionally, in some examples, detection of a motion event by the motion detector 102 may further trigger a computer vision-based object detector to determine whether an object of interest is detected within the activity zone in which motion was detected. The techniques described herein may result in significantly longer battery life of wireless camera devices.

As set forth above, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items may be stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be sent as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. The various features and processes described above may be used independently of one another, or may be combined in various ways. All possible combinations and subcombinations are intended to fall within the scope of this disclosure.

In addition, conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Although this disclosure has been described in terms of certain example embodiments and applications, other embodiments and applications that are apparent to those of ordinary skill in the art, including embodiments and applications that do not provide all of the benefits described herein, are also within the scope of this disclosure. The scope of the inventions is defined only by the claims, which are intended to be construed without reference to any definitions that may be explicitly or implicitly included in any incorporated-by-reference materials.

What is claimed is:

1. A method comprising:
   transmitting, by a radar sensor of an electronic device, a first signal representing a first frame;
   receiving, at a first receiver of the radar sensor, a second signal representing a reflected signal;
   determining, based on mixing together the first signal and the second signal, a third signal representing an intermediate frequency signal;
   determining, based on the third signal and using an analog to digital converter, a first set of values corresponding to the first frame, each value of the first set of values being associated with a respective time;
   determining, based on the first set of values and using a fast Fourier transform algorithm, a second set of values corresponding to the first frame, each value of the second set of values being associated with a respective frequency;
   determining, based on the second set of values corresponding to the first frame and a third set of values corresponding to a second frame, a fourth set of values representing differences between a reflection of the first frame and a reflection of the second frame, each value of the fourth set of values being associated with a respective frequency;
   determining, based on infrared light received at a passive infrared (PIR) sensor of the electronic device, a fifth set of values, each value of the fifth set of values being associated with a respective time; and
   predicting, based on inputting first input data into a first machine learning model, motion data indicating whether motion is detected, wherein the first input data comprises data representing the fourth set of values and the fifth set of values.

2. The method of claim 1, wherein the method comprises
   determining, during a first mode of operation of the electronic device, first passive infrared (PIR) data generated by the PIR sensor;
   determining, during the first mode of operation, first radar data generated by a radar sensor of an electronic device, the first radar data indicating preliminary motion detection by the radar sensor; and
   initiating a second mode of operation based on the first radar data or the first PIR data;
   wherein the generating of the motion data is based on the initiating of the second mode of operation.

3. The method of claim 1, wherein the determining of the motion data is based on radar data generated by the radar sensor during a first period of time and PIR data generated by the PIR sensor during the first period of time.

4. A method comprising:
   determining, using a radar sensor of an electronic device, first radar data;
   based on the first radar data, transitioning from a first mode of operation to a second mode of operation;
   based on the transitioning from the first mode of operation to the second mode of operation,
      determining, using a passive infrared (PIR) sensor of the electronic device, PIR data corresponding to a first time period,
      determining, using the radar sensor, second radar data corresponding to the first time period,
      predicting, based on inputting first data into a machine learning model, motion data indicating whether motion is detected, wherein the first data comprises data representing the PIR data and the second radar data; and
      generating, by a camera of the electronic device based on the motion data, image data.

5. The method of claim 4, wherein the first radar data comprises a Boolean value generated by an integrated circuit component of the radar sensor, the Boolean value indicating preliminary motion detection by the radar sensor, and the Boolean value having been determined based on a reflected signal received at a receiver of the radar sensor, the reflected signal representing a reflection of a first signal transmitted by a transmitter of the radar sensor.

6. The method of claim 4, wherein the first radar data indicates preliminary motion detection by the radar sensor, the first radar data having been determined based on a reflected signal received at a receiver of the radar sensor, the reflected signal representing a reflection of a first signal transmitted by a transmitter of the radar sensor.

7. The method of claim 4, wherein the first radar data comprises radar frame data generated based on a reflected signal received at a receiver of the radar sensor, the reflected signal representing a reflection of a first signal transmitted by a transmitter of the radar sensor.

8. The method of claim 4, wherein the transitioning from the first mode of operation to the second mode of operation is based on preliminary motion detection by the radar sensor for a first period of time.

9. The method of claim 8, wherein the second radar data is determined based on a first signal comprising a frequency modulated chirp.

10. The method of claim 4, wherein the transitioning from a first mode of operation to a second mode of operation comprises setting a parameter value.

11. The method of claim 4, wherein determining PIR data comprises requesting, by a controller of the electronic device from an integrated circuit component of the PIR sensor, the PIR data.

12. The method of claim 4, wherein determining the second radar data comprises receiving, at a controller of the electronic device from the radar sensor, the second radar data.

13. The method of claim 4, wherein the method comprises
transmitting, by the radar sensor, a first signal representing a first frame;
receiving, at a first receiver of the radar sensor, a second signal representing a reflected signal;
determining, based on the first signal and the second signal, a first set of values corresponding to the first frame, each value of the first set of values being associated with a respective time;
determining, based on the first set of values and using a fast Fourier transform algorithm, a second set of values corresponding to the first frame, each value of the second set of values being associated with a respective frequency;
determining, based on the second set of values corresponding to the first frame and a third set of values corresponding to a second frame, a fourth set of values representing differences between a reflection of the first frame and a reflection of the second frame; and
wherein the first data comprises the fourth set of values.

14. The method of claim 4, wherein the method comprises
transmitting, by the radar sensor, a first signal representing a first frame;
receiving, at a first receiver of the radar sensor, a second signal representing a reflected signal;
generating, based on mixing together the first signal and the second signal, a third signal representing an intermediate frequency signal;
determining, based on the third signal and using an analog to digital converter, a first set of values corresponding to the first frame, each value of the first set of values being associated with a respective time;
determining, based on the first set of values and using a fast Fourier transform algorithm, a second set of values corresponding to the first frame, each value of the second set of values being associated with a respective frequency;
determining, based on the second set of values corresponding to the first frame and a third set of values corresponding to a second frame, a fourth set of values representing differences between a reflection of the first frame and a reflection of the second frame; and
wherein the first data comprises the fourth set of values.

15. The method of claim 4, wherein the method further comprises transmitting, using a wireless interface of the electronic device, the image data.

16. The method of claim 4, wherein the method comprises
determining a first set of values based on one or more signals received at a first receiver of the radar sensor;
determining a second set of values based on one or more signals received at a second receiver of the radar sensor; and
determining a third set of values based on the first set of values and the second set of values;
wherein the determining of the motion data is based on the third set of values.

17. The method of claim 4, wherein the method comprises
transmitting, by the radar sensor, a first signal representing a first frame;
receiving, at a first receiver of the radar sensor, a second signal representing a reflected signal;
determining, based on the first signal and the second signal, a first set of values corresponding to the first frame, each value of the first set of values being associated with a respective time;
determining, based on the first set of values and using a fast Fourier transform algorithm, a second set of values corresponding to the first frame, each value of the second set of values being associated with a respective frequency;
determining, based on the second set of values corresponding to the first frame and a third set of values corresponding to a second frame, a fourth set of values representing differences between a reflection of the first frame and a reflection of the second frame;
receiving, at a second receiver of the radar sensor, a third signal representing a reflected signal;
determining, based on the first signal and the third signal, a fifth set of values corresponding to the first frame, each value of the fifth set of values being associated with a respective time;
determining, based on the fifth set of values and using a fast Fourier transform algorithm, a sixth set of values corresponding to the first frame, each value of the sixth set of values being associated with a respective frequency;
determining, based on the sixth set of values corresponding to the first frame and a seventh set of values corresponding to a second frame, an eighth set of values representing differences between a reflection of the first frame and a reflection of the second frame; and
determining a ninth set of values based on the fourth set of values and the eighth set of values;
wherein the determining of the motion data is based on the ninth set of values.

18. The method of claim 4, wherein the machine learning model comprises a convolutional neural network model, a recurrent neural network model, a transformer model, or a logistic regression model.

19. The method of claim 4, wherein the determining of the motion data is based on radar data generated by the radar sensor during a first period of time and PIR data generated by the PIR sensor during the first period of time.

20. The method of claim 4, wherein the method comprises, based on the first radar data, activating a microphone of the electronic device to generate audio data.

21. The method of claim 4, wherein the method comprises:
while operating in the first mode of operation, sending, by a controller of the electronic device to an integrated circuit component of the PIR sensor, data request messages at a first rate;
while operating in the second mode of operation, sending, by the controller of the electronic device to the integrated circuit component of the PIR sensor, data request messages at a second rate that is greater than the first rate.

22. The method of claim 4, wherein the first radar data represents a Boolean value and wherein the second radar data represents a plurality of complex numbers.

23. The method of claim 4, wherein the method comprises generating, using a microphone of the electronic device, audio data, and wherein the motion data is determined using the machine learning model based on the audio data.

24. The method of claim 4, wherein the method comprises, based on the motion data, activating a microphone of the electronic device to generate audio data.

25. An electronic device comprising:
a camera;
a wireless interface;
a passive infrared (PIR) sensor;
a radar sensor;
one or more computer readable media containing computer executable instructions for performing operations comprising
determining, using the radar sensor, first radar data,
based on the first radar data, transitioning from a first mode of operation to a second mode of operation,
based on the transitioning from the first mode of operation to the second mode of operation, determining, using the PIR sensor, PIR data,
determining, using the radar sensor, second radar data, and
predicting, based on inputting first data into a machine learning model, motion data indicating whether motion is detected, wherein the first data comprises data representing the PIR data and the second radar data,
generating, by a camera of the electronic device based on the motion data, image data.

26. The electronic device of claim 25, wherein the electronic device comprises
a removable battery pack; or
another PIR sensor.

27. The electronic device of claim 25, wherein the electronic device comprises a wireless interface, an ambient light sensor, a visible-light light emitting diode, an infrared-light light emitting diode, and an infrared cut filter.

28. The electronic device of claim 25, wherein the first radar data indicates preliminary motion detection by the radar sensor, the first radar data having been determined based on a reflected signal received at a receiver of the radar sensor, the reflected signal representing a reflection of a first signal transmitted by a transmitter of the radar sensor.

29. The electronic device of claim 25, wherein the first radar data comprises radar frame data generated based on a reflected signal received at a receiver of the radar sensor, the reflected signal representing a reflection of a first signal transmitted by a transmitter of the radar sensor.

30. The electronic device of claim 25, wherein the transitioning from the first mode of operation to the second mode of operation is based on preliminary motion detection by the radar sensor for a first period of time.

31. The electronic device of claim 30, wherein the second radar data is determined based on a first signal comprising a frequency modulated chirp.

32. The electronic device of claim 25, wherein the transitioning from a first mode of operation to a second mode of operation comprises setting a parameter value.

33. The electronic device of claim 25, wherein determining PIR data comprises requesting, by a controller of the electronic device from an integrated circuit component of the PIR sensor, the PIR data.

34. The electronic device of claim 25, wherein determining the second radar data comprises receiving, at a controller of the electronic device from the radar sensor, the second radar data.

35. The electronic device of claim 25, wherein the electronic device is a video doorbell.

36. A method comprising:
transmitting, by a radar sensor of an electronic device, a first signal representing a first frame;
receiving, at a first receiver of the radar sensor, a second signal representing a reflected signal;
generating, based on mixing together the first signal and the second signal, a third signal representing an intermediate frequency signal;
determining, based on the third signal and using an analog to digital converter, a first set of values corresponding to the first frame, each value of the first set of values being associated with a respective time;
determining, based on the first set of values and using a fast Fourier transform algorithm, a second set of values corresponding to the first frame, each value of the second set of values being associated with a respective frequency;
determining, based on the second set of values corresponding to the first frame and a third set of values corresponding to a second frame, a fourth set of values representing differences between a reflection of the first frame and a reflection of the second frame, each value of the fourth set of values being associated with a respective frequency;
determining, based on infrared light received at a passive infrared (PIR) sensor of the electronic device, a fifth set of values, each value of the fifth set of values being associated with a respective time; and
generating, based on inputting first data into a first machine learning model, motion data indicating whether motion is detected, wherein the first data comprises the fourth set of values and the fifth set of values.

* * * * *